United States Patent
Sheoran et al.

(10) Patent No.: US 9,500,505 B2
(45) Date of Patent: Nov. 22, 2016

(54) SYSTEM FOR GAS DISTRIBUTION AND MASS FLOW MEASUREMENT

(71) Applicant: HONEYWELL INTERNATIONAL INC., Morristown, NJ (US)

(72) Inventors: Yogendra Y. Sheoran, Scottsdale, AZ (US); William Facinelli, Phoenix, AZ (US); Alan Kang, Torrance, CA (US); Andrew Earl, Torrance, CA (US); Jun Isobe, Torrance, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 116 days.

(21) Appl. No.: 14/611,448

(22) Filed: Feb. 2, 2015

(65) Prior Publication Data

US 2016/0223375 A1    Aug. 4, 2016

(51) Int. Cl.
| | |
|---|---|
| *G01F 1/68* | (2006.01) |
| *G01F 1/684* | (2006.01) |
| *F16K 1/22* | (2006.01) |
| *F16K 37/00* | (2006.01) |
| *G01F 1/86* | (2006.01) |
| *G01F 1/69* | (2006.01) |
| *G05D 7/06* | (2006.01) |

(52) U.S. Cl.
CPC ............. *G01F 1/6842* (2013.01); *F16K 1/22* (2013.01); *F16K 37/005* (2013.01); *G01F 1/69* (2013.01); *G01F 1/86* (2013.01); *G05D 7/0629* (2013.01)

(58) Field of Classification Search
CPC ....................................................... G01F 1/68
USPC .............. 73/204.23, 204.27, 204.26, 204.12, 73/204.22
See application file for complete search history.

(56) References Cited

U.S. PATENT DOCUMENTS

| | | | |
|---|---|---|---|
| 3,146,751 A | 9/1964 | Von Schertel Hanns | |
| 5,893,146 A | 4/1999 | Pickett | |
| 6,487,904 B1 * | 12/2002 | Myhre | G01F 1/684 73/204.12 |
| 6,910,387 B2 | 6/2005 | Koudal et al. | |
| 7,954,373 B2 * | 6/2011 | Sukegawa | G01F 1/684 73/204.26 |
| 9,182,261 B1 * | 11/2015 | Chen | G01F 1/684 |

FOREIGN PATENT DOCUMENTS

KR    20020028142 A    4/2002

OTHER PUBLICATIONS

Landtec North America, Colton, California, USA—Landtec Thermal Gas Flow Meter Operations and Instruction Manual for Models LIA and LRA—2012.
Preso Flow Metering Equipment, Racine Wisconsin, USA—Ellipse Flow Sensor product brochure—2008.

* cited by examiner

*Primary Examiner* — Jewel V Thompson
(74) *Attorney, Agent, or Firm* — Shimokaji IP

(57) ABSTRACT

A gas distribution system may include a gas mass flow sensor with a resistive element configured to be heated, a thermally conductive shell surrounding the resistive element and heat-transfer control elements. The shell may include a leading surface oriented substantially orthogonal to a direction of gas flow. The heat-transfer control elements may be positioned to focus heat transfer from the resistive element through the leading surface of the shell so that a rate of heat transfer is independent from the variations in flow configuration.

20 Claims, 6 Drawing Sheets

SYSTEM FOR GAS DISTRIBUTION AND MASS FLOW MEASUREMENT

BACKGROUND OF THE INVENTION

The present invention generally relates to distribution of gas and sensors for measurement of mass of gas flow in a duct. More particularly, the invention relates to achieving and maintaining accuracy of flow measurement as the gas flow undergoes varying configurations of flow patterns.

In some distribution systems for a gas such as air, a flow control valve may be positioned within a duct through which the air is distributed. For example, the control valve may be a butterfly valve. A flow sensor may be positioned downstream from the valve and signals from the sensor may be employed to vary an angle of opening of the butterfly valve. By varying the angle of opening of the valve responsively to the flow sensor, a desired mass flow of air may be maintained irrespective of air pressure that may develop upstream of the valve.

A flow control valve may introduce variations of flow configuration as air passes through it. In a butterfly valve, for example, a clockwise swirl pattern may be introduced at a large valve angle opening, while at a smaller valve angle opening, a counterclockwise swirl pattern may be introduced. Additionally, a degree of turbulence in the flow downstream of the valve may vary as a function of valve angle opening.

A typical mass gas flow sensor may employ a heated sensing device which may transfer heat into gas passing the sensing device. The heated sensing device may be maintained at a desired temperature with an adjacent electrical heater. Determination of magnitude of mass flow passing the sensing device may be achieved by measuring an amount of current needed to maintain the heated sensing device at the desired temperature.

Typically the heated sensing device is housed within a thermally conductive shell. As flow configuration varies, more or less gas may impinge on various locations on the shell, thus producing variations in an amount of heat transferred from the shell into the passing gas flow. This may lead to reductions in accuracy of the mass gas flow sensor.

As can be seen, there may be a need for a mass gas flow sensor that can produce accurate results irrespective of a presence of variations in gas flow configuration.

SUMMARY OF THE INVENTION

In one aspect of the present invention, a gas distribution system comprises a gas mass flow sensor including; a temperature-sensitive resistive element, a thermally conductive shell surrounding the resistive element, and heat-transfer control elements; wherein the shell includes a leading surface oriented substantially to a direction of gas flow; and wherein the heat-transfer control elements are positioned to focus heat transfer from the resistive element through the leading surface of the shell so that a rate of heat transfer is independent from the variations in gas flow configuration.

In another aspect of the present invention, a gas mass flow sensor comprises a temperature-sensitive resistive element, a thermally conductive shell surrounding the resistive element, and flow guidance elements positioned to provide a gas flow path focused on a leading surface of the shell.

In yet another aspect of the present invention, a gas mass flow sensor comprises a temperature-sensitive resistive element, a thermally conductive shell surrounding the resistive element, and a thermal insulator positioned on a non-leading surface of the shell so that heat transfer from the shell is focused through a leading surface of the shell.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a gas mass flow sensor which may provide accurate flow sensing independently of variations in patterns of flow configuration. Moreover, the present invention may provide a gas distribution system that may utilize a butterfly valve for flow control and in which a gas mass flow sensor may be employed to accurately control position of the butterfly valve.

Figure 1:
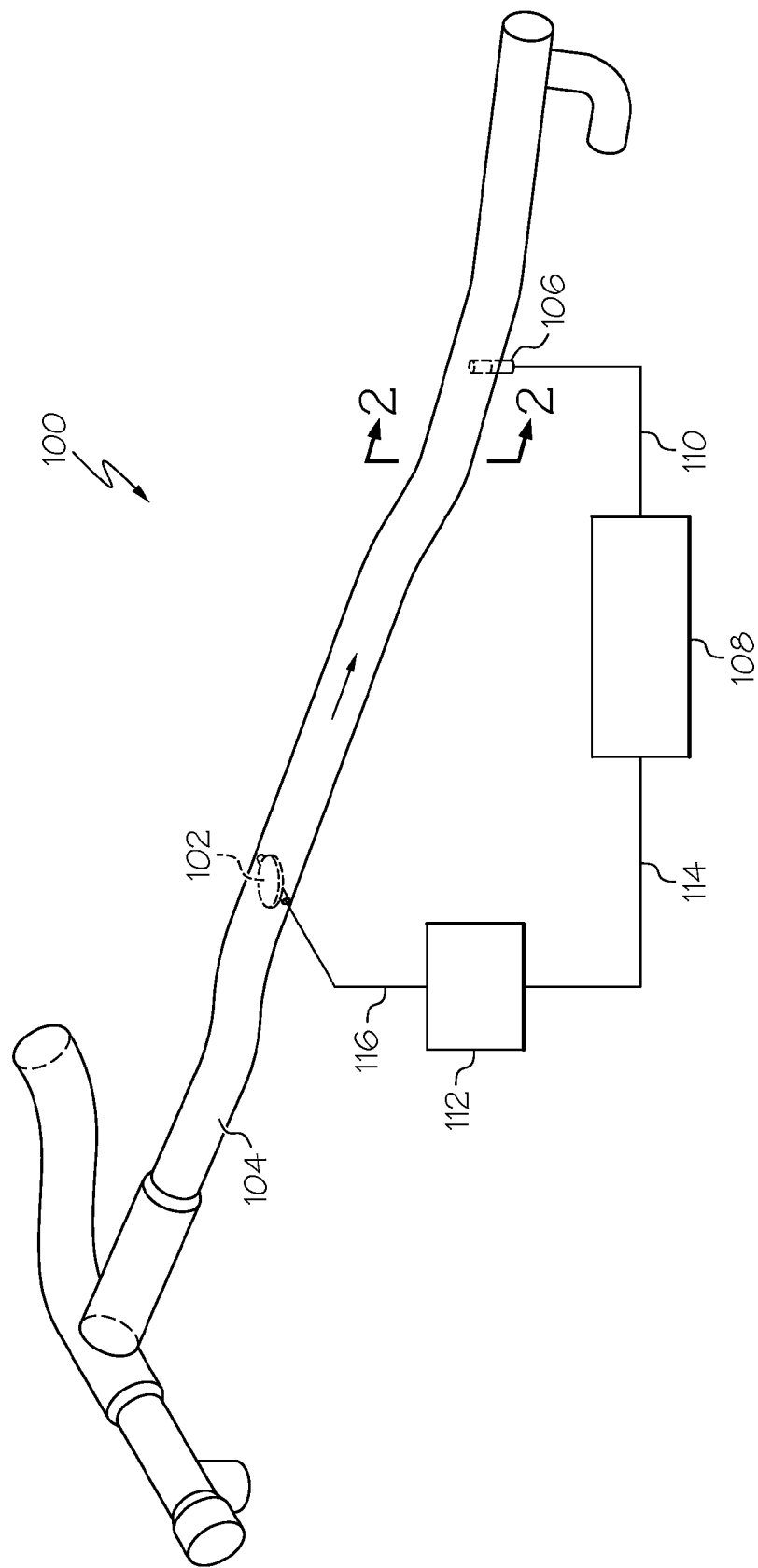
FIG. 1 is a perspective view of a gas distribution system according to an exemplary embodiment of the present invention.

Referring now to FIG. 1, an exemplary embodiment of a duct system 100 is illustrated with a gas flow control valve 102 positioned to control a rate of gas flow through a duct 104. In the exemplary embodiment of FIG. 1, the gas flow control valve 102 may be a butterfly valve. A gas mass flow sensor 106 may be positioned downstream from the valve 102. The gas mass flow sensor 106 may be provided with a sensor control unit 108 which may receive temperature signals 110 from the gas mass flow sensor 106. The sensor control unit 108 may also provide electrical current to the gas mass flow sensor 106. A valve control unit 112 may receive sensing signals 114 from the sensor control unit 108 and provide corresponding valve positioning signals 116 to the valve 102.

Figure 2:
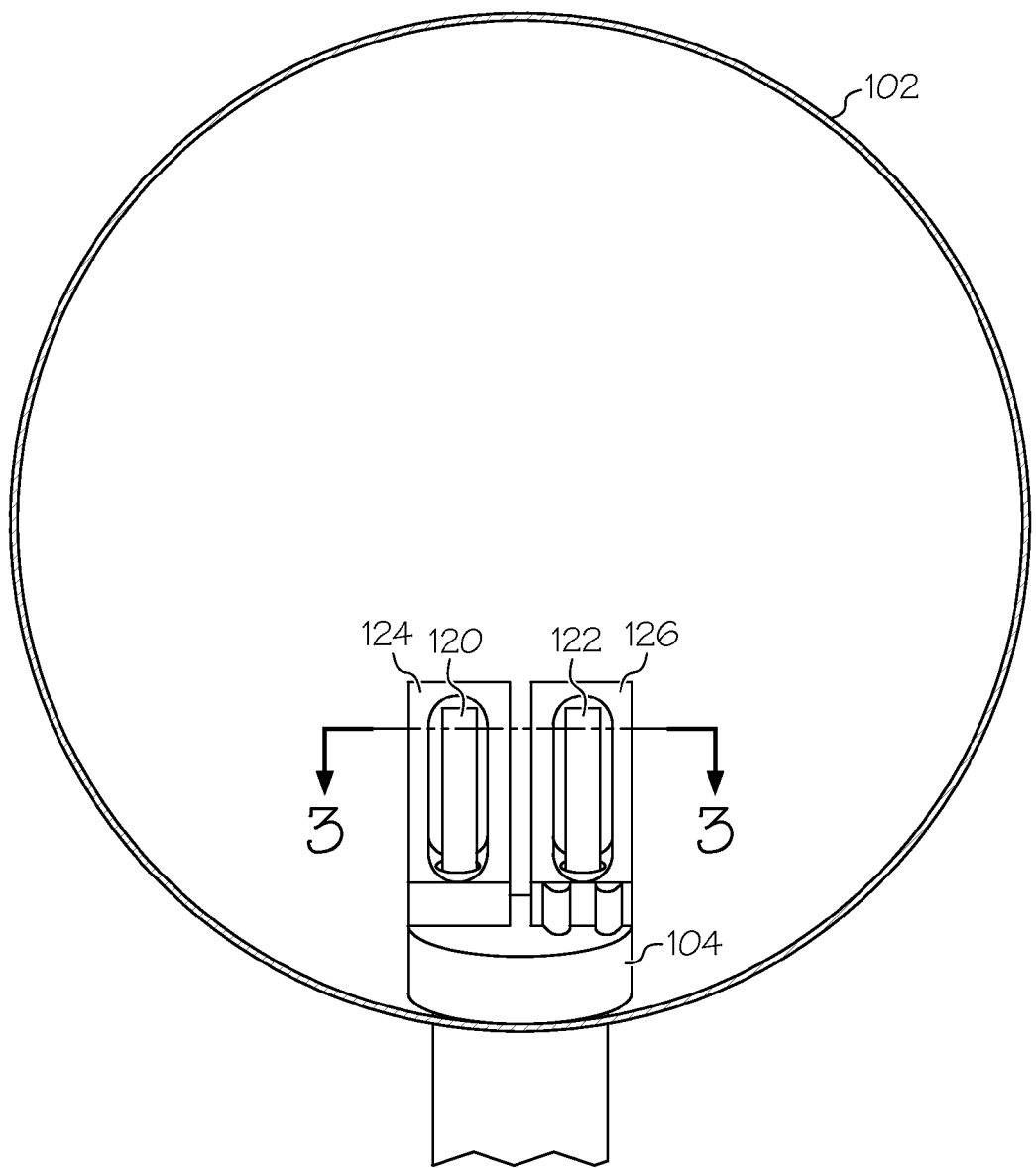
FIG. 2 is a sectional view, taken along the lines 2-2 of FIG. 1, showing a gas mass flow sensor according to an exemplary embodiment of the present invention.
Figure 3:
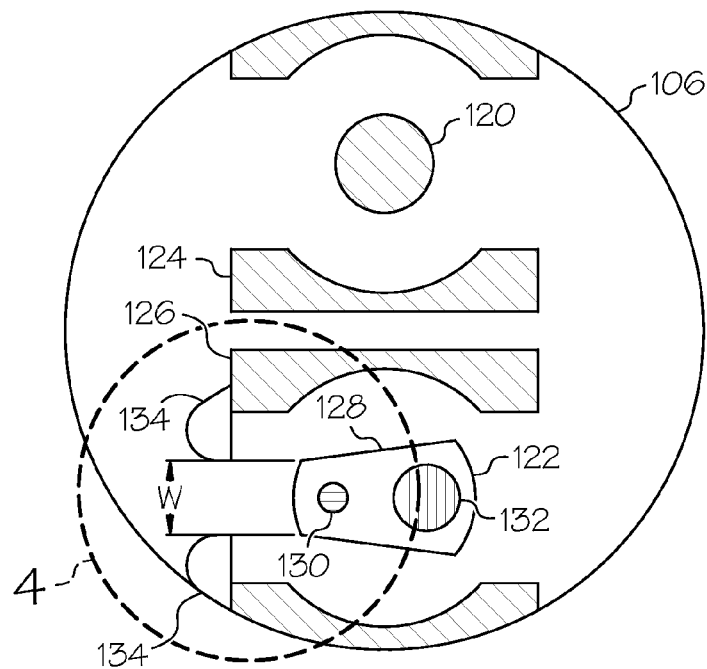
FIG. 3 is a sectional view of the gas mass flow sensor of FIG. 2, taken along the lines 3-3 of FIG. 2, according to an exemplary embodiment of the present invention.

Referring now to FIGS. 2 and 3, there is illustrated an exemplary embodiment of the gas mass flow sensor 104. The gas mass flow sensor 104 may include an ambient temperature sensor 120 and a flow sensing device 122. The ambient temperature sensor 120 may be partially surrounded by a housing 124. The flow sensing device 122 may be partially surrounded by a housing 126.

The flow sensing device 122 may include a thermally-conductive outer shell 128, a temperature-sensitive resistive element 130 and an electrical heater 132, both of which may be embedded in a heat-conducting material within the outer shell 128. The ambient temperature sensor 120 may be a temperature-sensitive resistive element. The gas mass flow sensor 104 may be configured so that the heater 132, during operation, maintains a desired temperature within the resistive element 130. The desired temperature may be established as a temperature that is a desired level above the ambient temperature as determined by the ambient temperature sensor 120. For example, the desired temperature for the resistive element 130 may be selected as about 40° C. greater than the ambient temperature.

Gas flowing past the flow sensing device 122 may result in heat transfer from the resistive element 130, through the outer shell 128 and into the flowing gas. The heater 132 may supply heat to the resistive element 130 to offset the heat transfer and thus maintain the desired temperature within the resistive element 130. An amount of current needed to produce the requisite heating may be indicative of the rate of gas mass flow past the flow sensing device 122. For example, rapid cooling of the resistive element 130 may occur when gas flow rate is high. In that case, current supplied to the heater 132 may be correspondingly high. Conversely, when flow rate is low, current to the heater 132 may be correspondingly low. The control units 108 and 112 of FIG. 1 may operate collectively to control angular positioning of the valve 102 and thereby regulate gas mass flow through the duct 104.

Figure 4:
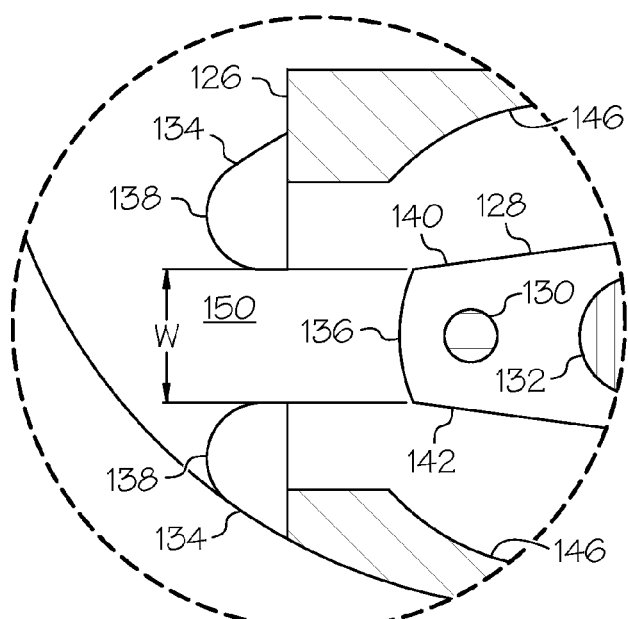
FIG. 4 is a detailed partial view of the gas mass flow sensor shown in FIG. 3 according to an exemplary embodiment of the present invention.

Referring now to FIG. 4, it may be seen that the housing 126 may be provided with flow guidance elements 134. The flow guidance elements 134 may be formed integrally with the housing 126 or, alternatively, the elements 134 may be formed separately and then attached to the housing 126. The flow guidance elements 134 may be spaced apart from one another to form a flow path 150 with a width W, which width W may be about the same as a width of a leading surface 136 of the shell 128. The flow guidance elements 134 may have curved leading surfaces 138 The leading surfaces 138 may be shaped as arc segments or as segments of an ellipse. In general shape of the leading surface may enable flow-vector stability, flow concentration, and enough mass flow to achieve a desired sensor sensitivity.

In operation, gas flow entering the housing 126 may be guided so that it is concentrated onto the leading surface 136 of the shell 128. The leading surface 136 may be oriented substantially orthogonal to a direction of the gas flow. After striking the leading surface 136, the flow may be driven outwardly toward inner surfaces 146 of the housing 126. In that regard the flow may be considered to be "lifted away" from an inboard surface 140 and an outboard surface 142 of the shell 128. As a consequence of this beneficial flow lifting, heat may transfer from the resistive elements 130 to the flow, principally through the leading surface 136. Heat transfer through the inboard and outboard surfaces 140 and 142 may be negligible. In other words, the flow guidance elements 134 may be considered to be heat-transfer control elements positioned to focus heat transfer from the resistive element 130 through the leading surface 136 of the shell 128 so that a rate of heat transfer, at areas other than the leading surface 136, may be independent from the variations in flow configuration.

If the flow guidance elements 134 were not present on the housing 126, incoming gas flow might not be lifted away from the inboard and the outboard surfaces 140 and 142 of the shell 128 and may instead envelop the surfaces 140 and 142. Such envelopment might be asymmetrical or otherwise non-uniform because the gas flow may experience any one of numerous possible variations of flow patterns that may have been introduced when the gas passed through the valve 102 of FIG. 1. Under such circumstances, heat transfer from the resistive element 130 to the gas flow might be non-uniform. Indeed, the heat transfer might vary as a function of angular positioning of the valve 102 because, for example, gas flow may swirl in a clockwise direction (when viewed in the direction of lines 2-2 of FIG. 1) at large valve opening angles, while at small valve opening angles, gas flow may swirl in a counterclockwise direction (when viewed in the direction of lines 2-2 of FIG. 1).

Figure 5:
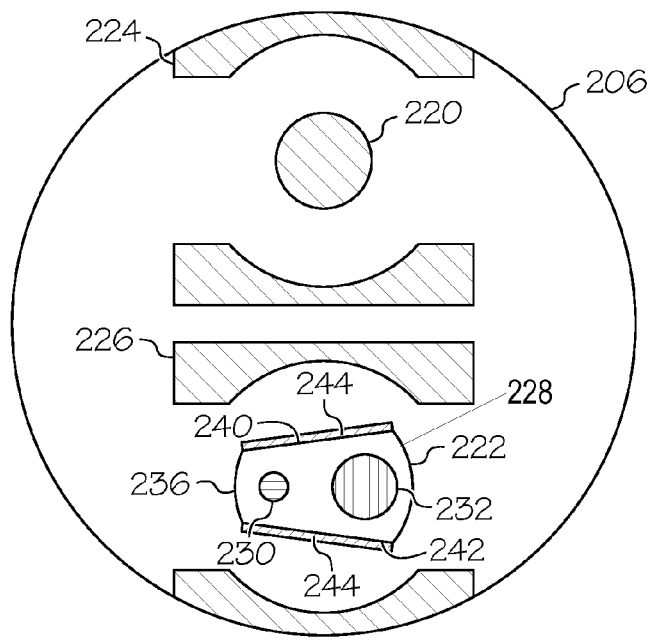
FIG. 5 is a sectional view of a gas mass flow sensor according to a second exemplary embodiment of the present invention.

Referring now to FIG. 5, an exemplary embodiment of a gas mass flow sensor 206 may include a housing 224, a housing 226, ambient temperature sensor 220 and a flow sensing device 222. The gas mass flow sensor 206 may differ from the sensor 106 of FIGS. 3 and 4 in that there may be no flow guidance elements attached to the housing 226. Additionally the sensor 206 may differ from the sensor 106 in that an outer shell 228 may be provided with thermal insulators 244 along its inboard surface 240 and its outboard surface 242. The inboard and outboard surfaces 240 and 242 may be considered to be non-leading surfaces of the shell 228. The thermal insulators 244 may provide the beneficial effect of precluding heat transfer from the resistive element 230 to the gas flow through the inboard and outboard surfaces 240 and 242 of the shell 228. In other words, the thermal insulators 244 may be considered to be heat-transfer control elements positioned to focus heat transfer from the resistive element 230 through a leading surface 236 of the shell 228, which leading surface 236 may be oriented substantially orthogonal to a direction of gas flow. Consequently, a rate of heat transfer may be independent from the variations in flow configuration.

Figure 6:
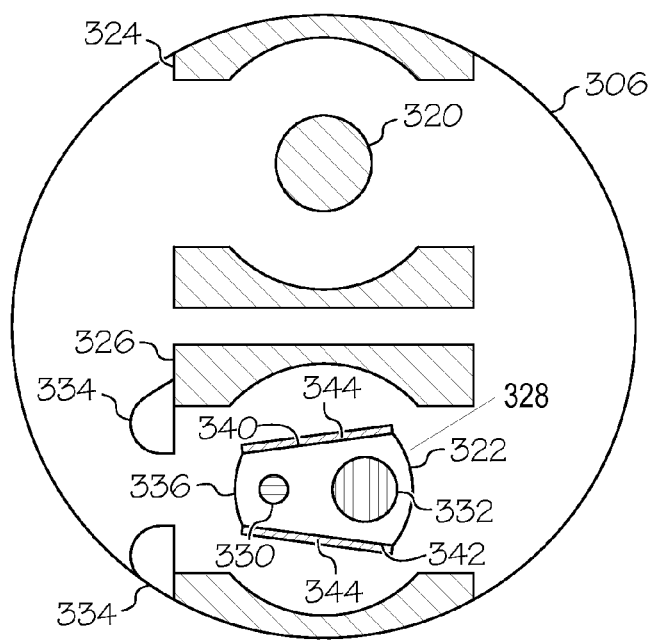
FIG. 6 is a sectional view of a gas mass flow sensor according to a third exemplary embodiment of the present invention.

Referring now to FIG. 6, an exemplary embodiment of a gas mass flow sensor 306 is shown. The sensor 306 may differ from the sensor 206 of FIG. 5 in that the sensor 306 is provided with flow guidance elements 336. The sensor 306 may differ from the sensor 106 of FIGS. 3 and 4 in that an outer shell 328 may be provided with thermal insulators 344 along its inboard surface 340 and its outboard surface 342. The gas mass flow sensor may include a housing 324, a housing 326, ambient temperature sensor 320, a flow sensing device 322 and flow guidance elements 334. The thermal insulators 344, in combination with the flow guidance elements 334, may provide the beneficial effect of precluding heat transfer from the resistive element 330 to the gas flow through the inboard and outboard surfaces 340 and 342 of the shell 328. In other words, the thermal insulators 344 and the flow guidance elements may be considered to be heat-transfer control elements positioned to focus heat transfer from the resistive element 330 through a leading surface 336 of the shell 328, which leading surface 336 may be oriented substantially orthogonal to a direction of gas flow.

Consequently a rate of heat transfer may be independent from the variations in flow configuration.

Figure 7:
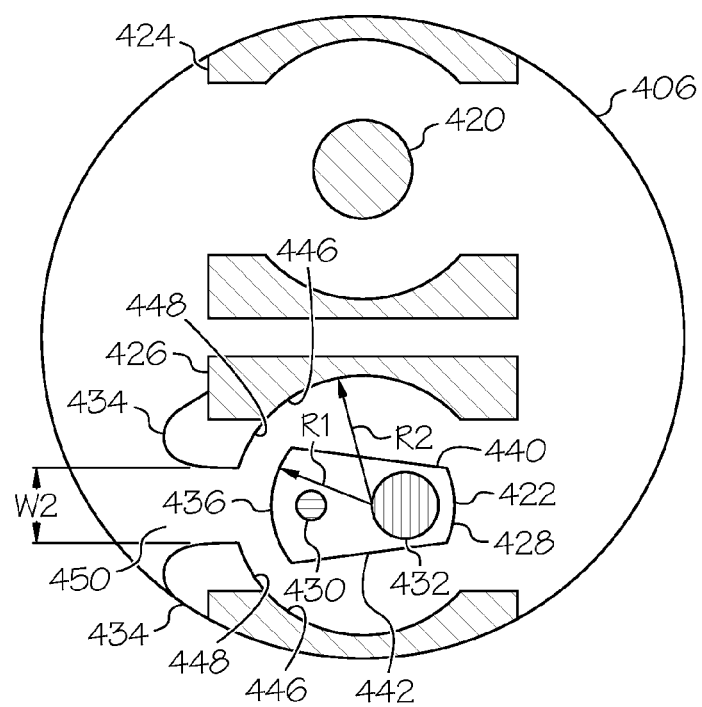
FIG. 7 is a sectional view of a gas mass flow sensor according to a fourth exemplary embodiment of the present invention.

Referring now to FIG. 7, an exemplary embodiment of a gas mass flow sensor 406 that differs from the gas mass flow sensors 106, 206 and 306 in that a leading surface 436 is longer than the leading surfaces 136, 236 and 336 of the sensors 106, 206 and 306 respectively. The gas mass flow sensor 406 may include a housing 424, a housing 426, ambient temperature sensor 420, a flow sensing device 422, flow guidance elements 434 and a shell 428. A flow opening or flow path 450 between the flow guidance elements 434 may have a width W2 that is about 50% of a length of the leading surface 436 of the shell 428. The leading surface 436 may be oriented substantially orthogonal to a direction of gas flow. Trailing surfaces 448 of the flow guidance elements 434 may be shaped as first arc segments. An inner surface 446 of the housing 426 may shaped as a second arc segment that is a continuation of the trailing surface 448 of an adjacent one of the flow guidance elements 434. A leading surface 436 of the shell 428 may be shaped as a third arc segment with a radius R1. The first and second arc segments may have a common radius R2 and may be concentric with the third arc segments. Gas flow entering the housing 426 may be initially directed to the leading surface 436 of the shell 428. The gas flow may then accelerate so that it tends to follow the trailing surfaces 448 of the flow guidance elements 434 and the inner surface 446 of the housing 426. Consequently, the gas flow may effectively "lift away" from the inboard and outboard surfaces 440 and 442 of the shell 428. Beneficial focusing of heat transfer through the leading surface 436 of the shell 428 may result.

Figure 8:
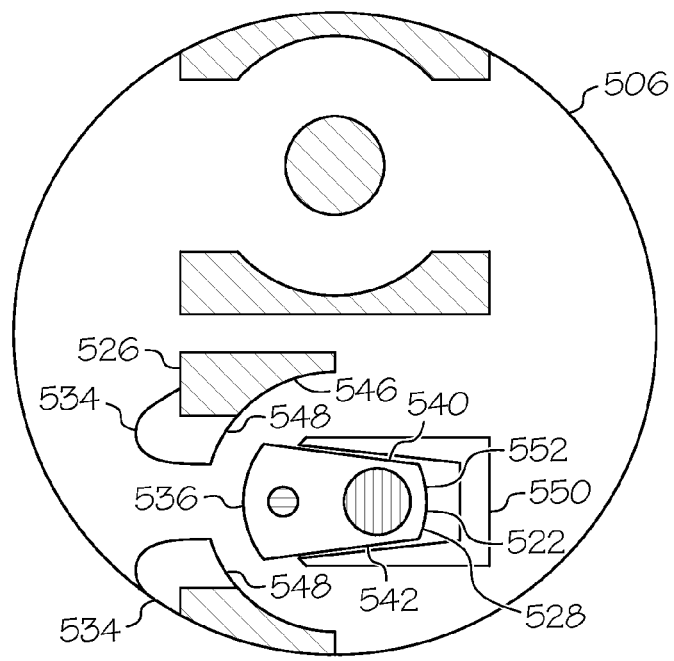
FIG. 8 is a sectional view of a gas mass flow sensor according to a fifth exemplary embodiment of the present invention.

Referring now to FIG. 8, an exemplary embodiment of a gas mass flow sensor 506 may have a configuration similar to the gas mass flow sensor 406 of FIG. 7. The sensor 506 may differ from the sensor 406 in that a thermal insulator 550 may surround a trailing surface 552 and portions of an inboard surface 540 and outboard surface 542 of a shell 528. Just as in the sensor 406, gas flow entering a housing 526 may be initially directed to a leading surface 536 of the shell 528. The gas flow may then accelerate so that it tends to follow trailing surfaces 548 of the flow guidance elements 534 and an inner surface 546 of a truncated housing 526. The gas flow may effectively "lift away" from inboard and outboard surfaces 540 and 542 of the shell 528. Beneficial focusing of heat transfer through the leading surface 536 of the shell may result. Further beneficial focusing of heat transfer may be provided by presence of the thermal insulator 550.

Figure 9:
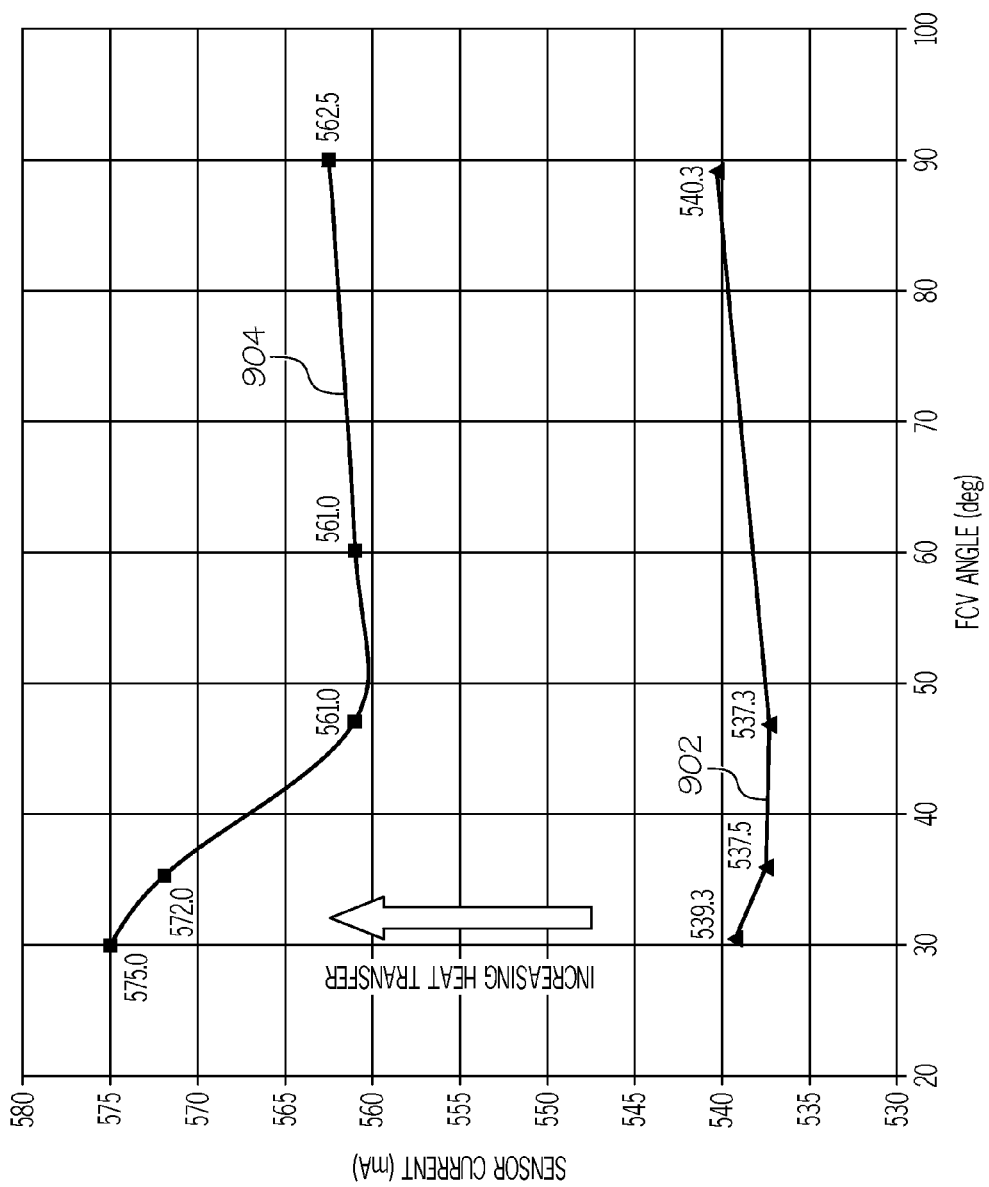
FIG. 9 is graph showing exemplary comparative performance characteristics of the gas mass flow sensor of FIG. 1.

FIG. 9 illustrates some comparative data that demonstrates the efficacy of employing the flow guidance elements 134 on the gas mass flow sensor 106 of FIGS. 3 and 4. A graph curve 902 illustrates an amount of current applied to the heater 132 in order to maintain a desired temperature in the resistive element 130 while maintain a constant flow rate of 60 pounds per minute (ppm). The current varies slightly as a function of angle of opening of the valve 102 of FIG. 1. Graph curve 904 illustrates a condition in which the flow guidance elements are removed from the sensor 106. The curve 904 shows an amount of current applied to the heater 132 in order to maintain a desired temperature in the resistive element 130 while maintaining a constant flow rate of 60 ppm. The current of curve 904 varies substantially as a function of angle of opening of the valve 102 of FIG. 1. Current variation may be particularly acute at valve opening angles less than about 50 degrees. For example, the current variation of curve 902 may be about six times smaller than the current variation of curve 904 at a valve openings of 30 degrees.

In normal operation of a mass gas flow sensor, such as the sensor 106, variations in current going to the heater 132 of FIG. 3 would be perceived as indicators of variations in gas mass flow. In the constant flow rate context of the graphs 902 and 904, variations of current are indicative of sensor inaccuracy. Current variation during constant flow rate conditions provides a false indication of variation in flow rate when, in fact, no such variation is occurring. In other words, the measured current variations shown in graphs 902 and 904 are reflective of a degree of accuracy of the sensors which are the subjects of graphs 902 and 904.

It should be understood, of course, that the foregoing relates to exemplary embodiments of the invention and that modifications may be made without departing from the spirit and scope of the invention as set forth in the following claims.

We claim:
1. A gas distribution system, comprising:
a gas mass flow sensor including;
   a temperature-sensitive resistive element,
   a thermally conductive shell surrounding the resistive element, and
   heat-transfer control elements;
wherein the shell includes a leading surface oriented substantially orthogonal to a direction of gas flow; and
wherein the heat-transfer control elements are positioned to focus heat transfer from the resistive element through the leading surface of the shell so that a rate of heat transfer is independent from the variations in gas flow configuration.

2. The gas distribution system of claim 1 further comprising a flow control valve;
wherein gas flow through the control valve results in the variations of flow configuration; and
wherein the variations of flow configuration are a function of valve opening position.

3. The gas distribution system of claim 2:
wherein the control valve is a butterfly valve; and
wherein the variations of flow configuration are a function of opening angle of the butterfly valve.

4. The gas distribution system of claim 1 wherein the heat-transfer control elements comprise:
a thermal insulator element attached to an inboard surface of the shell: and
one of the thermal insulator elements attached to an outboard surface of the shell.

5. The gas distribution system of claim 1 further comprising a housing partially surrounding the shell, wherein the heat-transfer control elements comprise flow guidance elements coupled to the housing.

6. The gas distribution system of claim 5 wherein the flow guidance elements are positioned to provide a flow path that focuses on the leading surface of the shell.

7. The gas distribution system of claim 6 further comprising:
a thermal insulator element attached to an inboard surface of the shell: and
one of the thermal insulator elements attached to an outboard surface of the shell.

8. A gas mass flow sensor, comprising:
a temperature-sensitive resistive element,
a thermally conductive shell surrounding the resistive element, and flow guidance elements positioned to provide a gas flow path focused on a leading surface of the shell.

9. The gas mass flow sensor of claim 8:
wherein the flow guidance elements are spaced apart from one another to form a flow path with a width W; and
wherein the leading surface of the shell has a width about equal to the width W.

10. The gas mass flow sensor of claim 8 wherein at least one of the flow guidance elements has a leading surface shaped as an arc segment.

11. The gas mass flow sensor of claim 8 wherein at least one of the flow guidance elements has a leading surface shaped as a segment of an ellipse.

12. The gas mass flow sensor of claim 8 further comprising:
a housing partially surrounding the shell, the housing having an inner surface spaced apart from the shell; and
wherein the flow guidance elements are coupled to the housing.

13. The gas mass flow sensor of claim 12:
wherein at least one of the flow guidance elements has a trailing surface that is shaped as a first arc segment;
wherein at least a portion of the inner surface of the housing, adjacent the trailing surface of the at least one flow guidance element, is shaped as a second arc segment that is a continuation of the first arc segment;
wherein the leading surface of the shell is shaped as a third arc segment; and
wherein the first and second arc segments are concentric with the third arc segment.

14. A gas mass flow sensor comprising:
a temperature-sensitive resistive element,
a thermally conductive shell surrounding the resistive element, and
a thermal insulator positioned on a non-leading surface of the shell so that heat transfer from the shell is focused through a leading surface of the shell.

15. The gas mass flow sensor of claim 14:
wherein a first one of the thermal insulators is attached to an inboard surface of the shell; and
wherein a second one of the thermal insulators is attached to an outboard surface of the shell.

16. The gas mass flow sensor of claim 14 wherein the at least one thermal insulator surrounds a trailing surface of the shell and at least portions of an inboard surface and an outboard surface of the shell.

17. The gas mass flow sensor of claim 16 further comprising flow guidance elements positioned to provide a flow path focused on the leading surface of the shell.

18. The gas mass flow sensor of claim 17 further comprising:
a housing partially surrounding the shell, the housing having an inner surface spaced apart from the shell; and
wherein the flow guidance elements are coupled to the housing.
wherein at least one of the flow guidance elements has a trailing surface that is shaped as a first arc segment;
wherein at least a portion of the inner surface of the housing, adjacent the trailing surface of the at least one flow guidance element, is shaped as a second arc segment that is a continuation of the first arc segment;
wherein the leading surface of the shell is shaped as a third arc segment; and
wherein the first and second arc segments are concentric with the third arc segment.

19. The gas mass flow sensor of claim 18 wherein a flow path between the flow guidance elements has a width W2 that is about 50% of a width of the leading surface of the shell.

20. The gas mass flow sensor of claim 14 further comprising flow guidance elements positioned to provide a flow path focused on the leading surface of the shell.

* * * * *